(12) United States Patent
Shellenberger

(10) Patent No.: US 12,528,391 B2
(45) Date of Patent: Jan. 20, 2026

(54) CHILD RESTRAINT

(71) Applicant: Dorel Juvenile Group, Inc., Foxboro, MA (US)

(72) Inventor: Mitchell Shellenberger, Mount Joy, PA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 318 days.

(21) Appl. No.: 18/304,841

(22) Filed: Apr. 21, 2023

(65) Prior Publication Data

US 2023/0339372 A1    Oct. 26, 2023

Related U.S. Application Data

(60) Provisional application No. 63/333,458, filed on Apr. 21, 2022.

(51) Int. Cl.
   *B60N 2/28* (2006.01)

(52) U.S. Cl.
   CPC ......... *B60N 2/2821* (2013.01); *B60N 2/2812* (2013.01)

(58) Field of Classification Search
   CPC ....... B60N 2/28; B60N 2/2812; B60N 2/2821
   See application file for complete search history.

(56) References Cited

U.S. PATENT DOCUMENTS

| | | |
|---|---|---|
| 6,193,312 B1 | 2/2001 | Yoshida |
| 7,021,710 B2 | 4/2006 | Kain |
| 7,547,066 B2 | 6/2009 | Mendenhall |
| 7,625,043 B2 | 12/2009 | Hartenstine |
| 8,109,571 B2 | 2/2012 | Chen |
| 8,141,951 B2 | 3/2012 | Chen |
| 8,226,164 B2 | 7/2012 | Chen |
| 9,221,365 B2 | 12/2015 | Williams |
| 9,376,037 B1 * | 6/2016 | Mattarocci ........... B60N 2/2812 |
| 10,112,508 B2 * | 10/2018 | Pleiman ................. B60N 3/101 |
| 10,245,981 B2 * | 4/2019 | Mitchell ............... B60N 2/2816 |
| 11,186,209 B2 * | 11/2021 | Häußler ............... B60N 2/2812 |
| 2012/0292965 A1 | 11/2012 | Sedlack |
| 2018/0194252 A1 * | 7/2018 | Sack .................... B60N 2/2866 |
| 2021/0053471 A1 * | 2/2021 | Shellenberger ...... B60N 2/2821 |
| 2021/0094448 A1 | 4/2021 | Zhao |

OTHER PUBLICATIONS

Evenflo, EveryFit 4-in-1 Car Seat Owner's Manual, Oct. 2019, 84 pages.

* cited by examiner

*Primary Examiner* — Philip F Gabler
(74) *Attorney, Agent, or Firm* — Barnes & Thornburg LLP

(57) ABSTRACT

A child restraint includes a seat foundation and a juvenile seat including a seat back fixed to the seat foundation for movement therewith and a seat bottom coupled to the seat back. The seat foundation is adapted to rest on a vehicle seat. The juvenile seat is supported by the seat foundation on the vehicle seat.

19 Claims, 6 Drawing Sheets

CHILD RESTRAINT

PRIORITY CLAIM

This application claims priority under 35 U.S.C. § 119(e) to U.S. Provisional Application Ser. No. 63/333,458, filed Apr. 21, 2022, which is expressly incorporated by reference herein.

BACKGROUND

The present disclosure relates to a child restraint, and particularly to juvenile seat. More particularly, the present disclosure relates to a juvenile seat configured to be secured to a vehicle seat for transportation in a vehicle.

SUMMARY

According to the present disclosure, a child restraint includes a seat foundation, and a juvenile seat including a seat back fixed to the seat foundation for movement therewith and a seat bottom coupled to the seat back. The seat foundation is adapted to rest on a vehicle seat. The juvenile seat is supported by the seat foundation on the vehicle seat.

In illustrative embodiments, the seat bottom includes a booster-seat mount, a booster seat, and a booster-seat release unit. The booster-seat mount is fixed to the seat back for movement therewith. The booster seat is coupled to the booster-seat mount to arrange the child restraint in a juvenile-seat mode in which the booster seat and the seat back cooperate to provide a seating surface for a child. The booster-seat release unit configured to block selectively separation of the booster seat from the booster-seat mount and configured to disengage from the booster-seat mount so that the booster seat is separable from the seat back and the seat foundation for placement on the vehicle seat without the seat foundation and the seat back in a booster mode.

In illustrative embodiments, the child restraint further includes a child restraint harness. The child restraint harness includes a crotch belt coupled to the booster seat, a buckle coupled to the crotch belt, and a pair of should straps coupled to the seat back and configured to attach selectively to the buckle to secure a child to the juvenile seat in the juvenile-seat mode.

In illustrative embodiments, the booster-seat mount includes a mount platform fixed to the seat back and a mount rod coupled to the mount platform. The mount platform is arranged to extend in a forward direction away from the seat back and is configured to support the booster seat in the juvenile-seat mode. The mount rod is coupled to the mount platform and to the seat foundation to mount the seat back and the booster-seat mount to the seat foundation.

In illustrative embodiments, in the juvenile-seat mode, the booster-seat release unit engages the mount rod to fix the booster seat to booster-seat mount. In the booster mode, the booster seat, the crotch belt, and the buckle are separated from the seat back and the pair of shoulder straps so that the pair of shoulder straps cannot be used to secure a child to the seat back without the booster seat being attached to the booster-seat mount in the juvenile-seat mode.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a child restraint, in accordance with the present disclosure, including a seat foundation adapted to rest on a vehicle seat and a juvenile seat configured to support a child in both a juvenile-seat mode in which the child restraint includes both a seat bottom and a seat back, and a booster mode, in which a removable booster seat included in the seat bottom is separated from the seat foundation and the seat back of the child restraint to provide a standalone booster seat;

Figure 4:
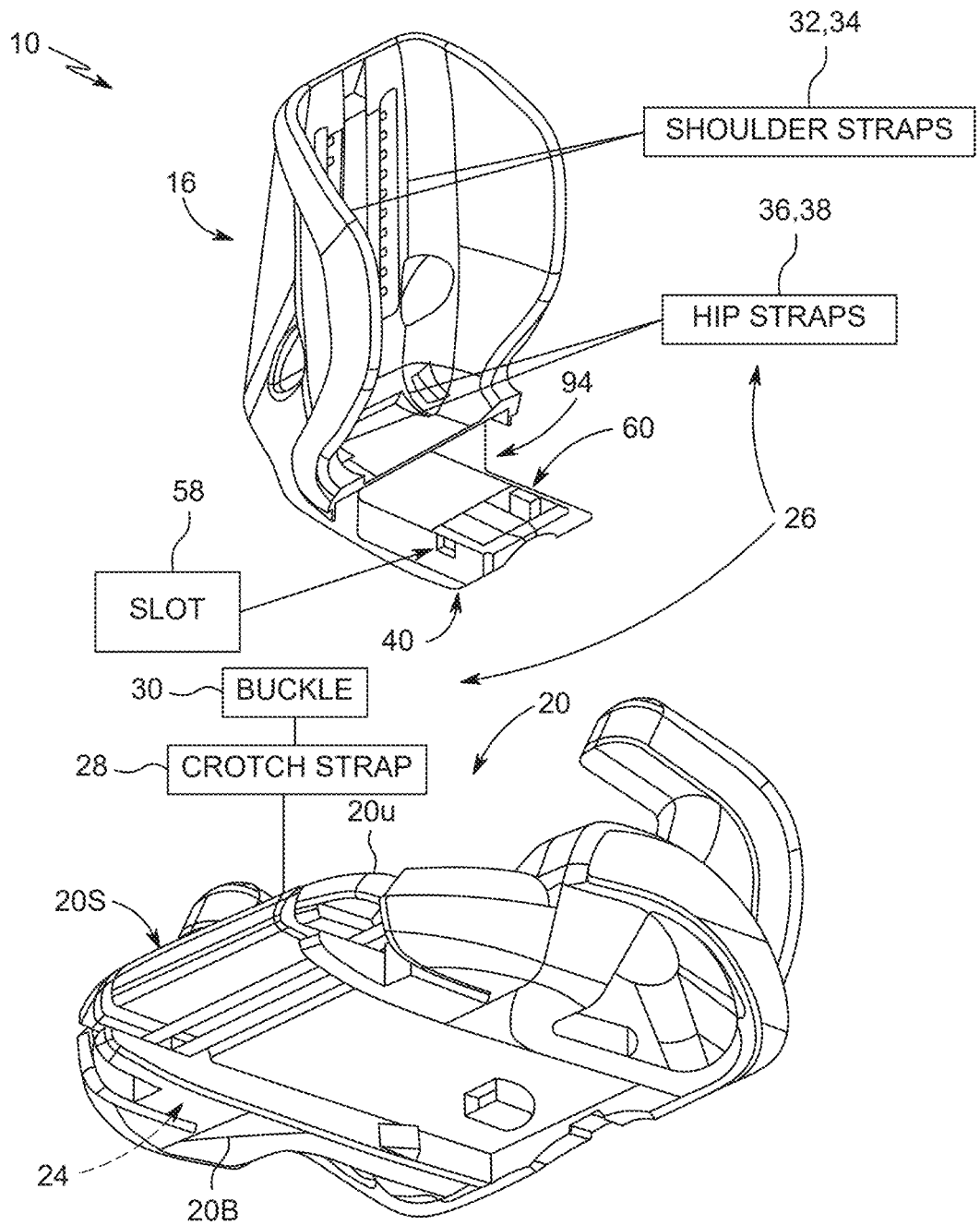
Figure 5:
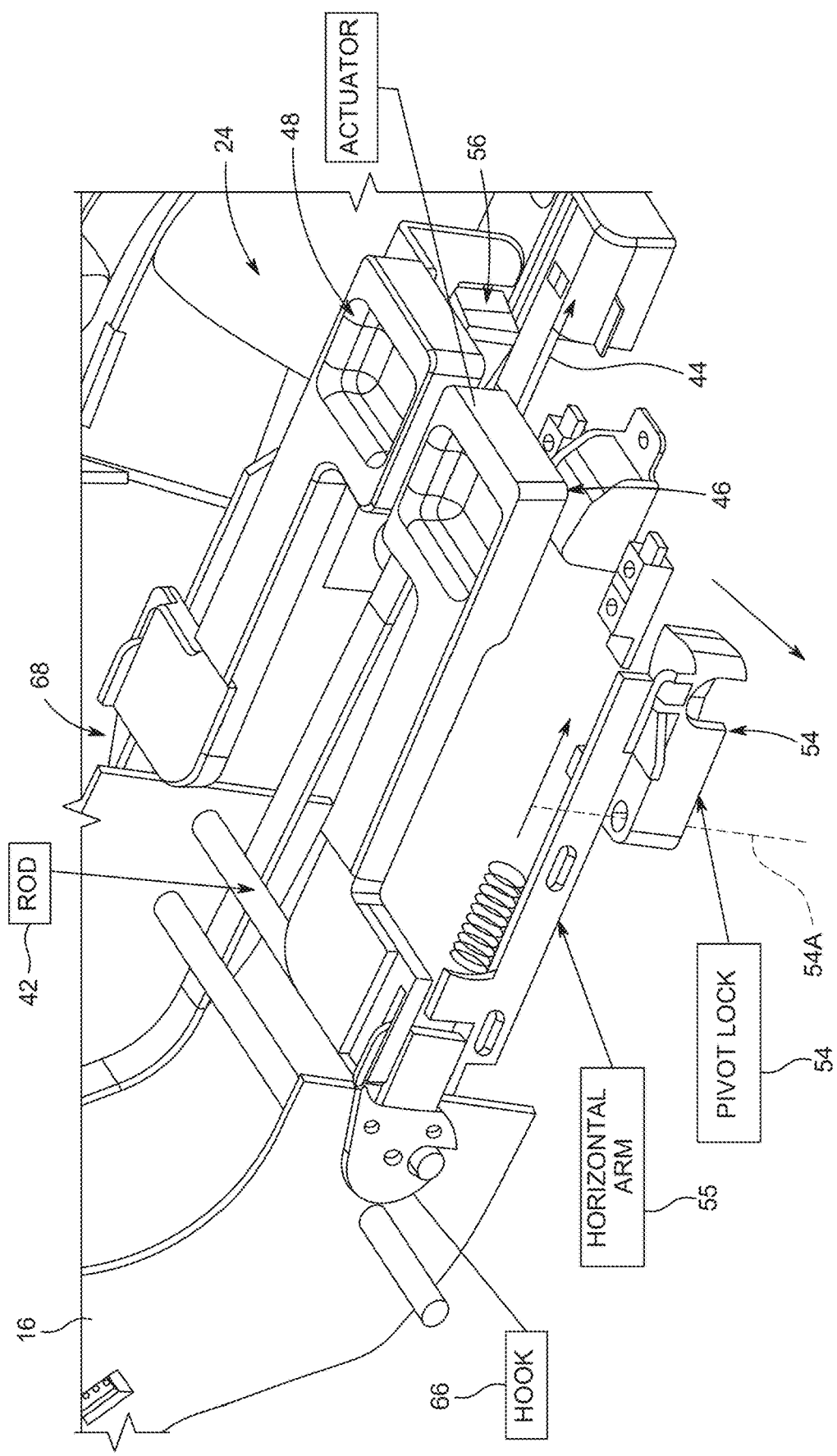
Figure 6:
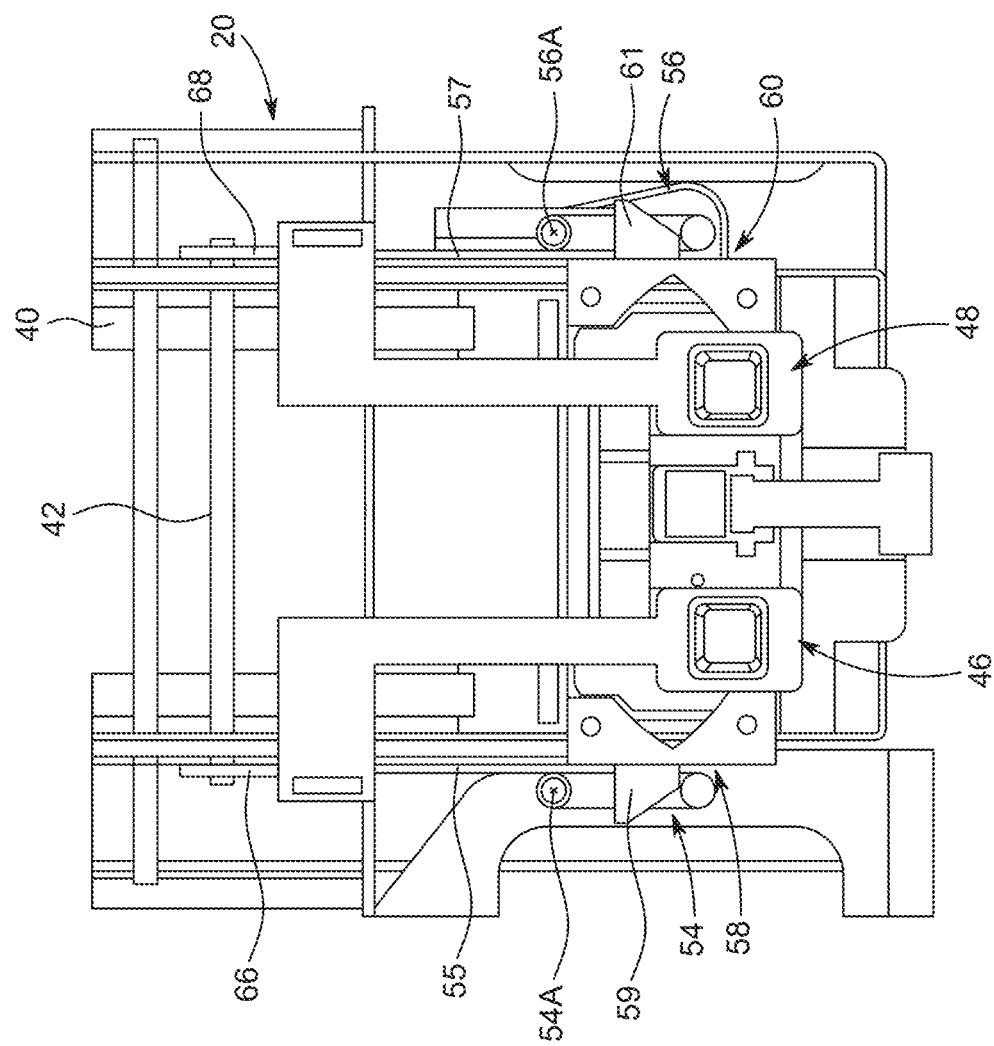
Figure 7A:
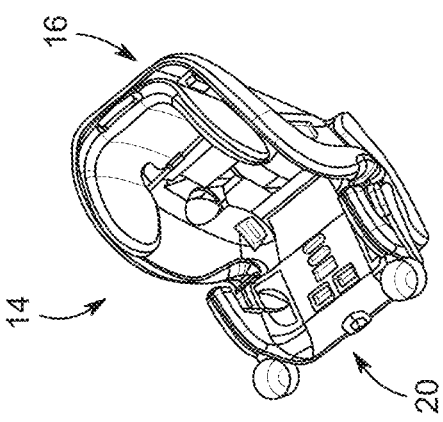
Figure 7B:
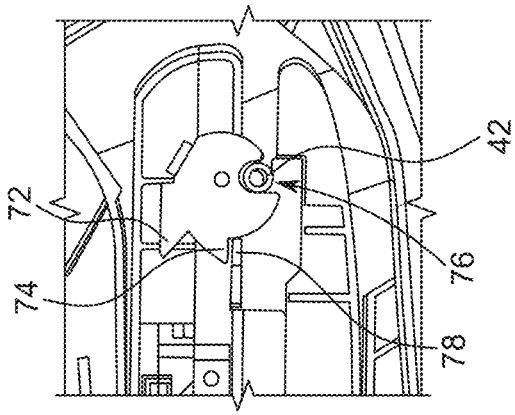
Figure 7C:
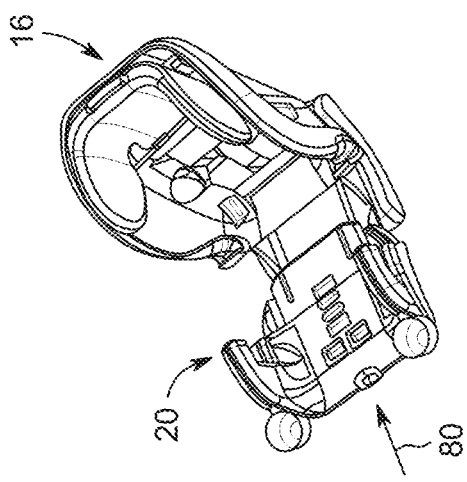
Figure 8A:
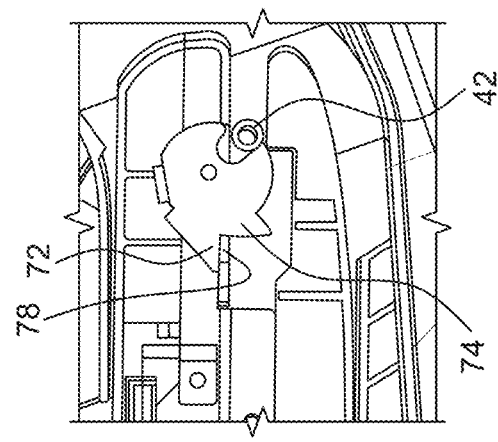
Figure 8B:
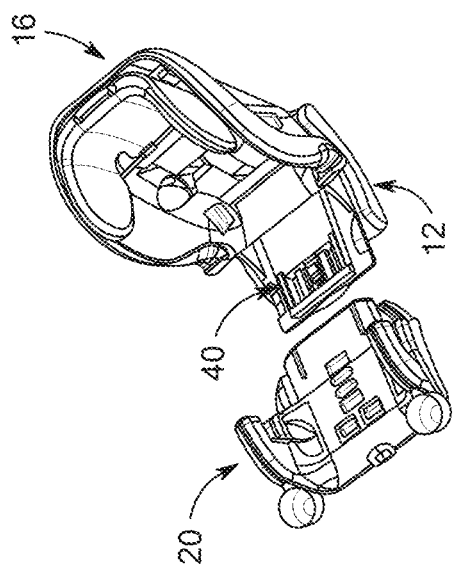
Figure 8C:
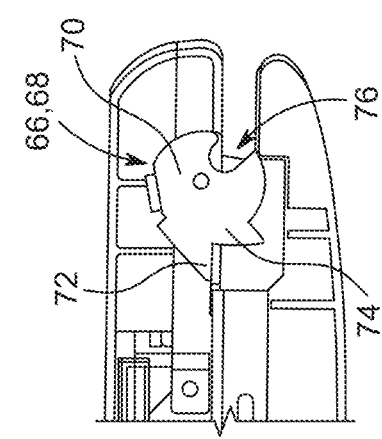
Figure 9:
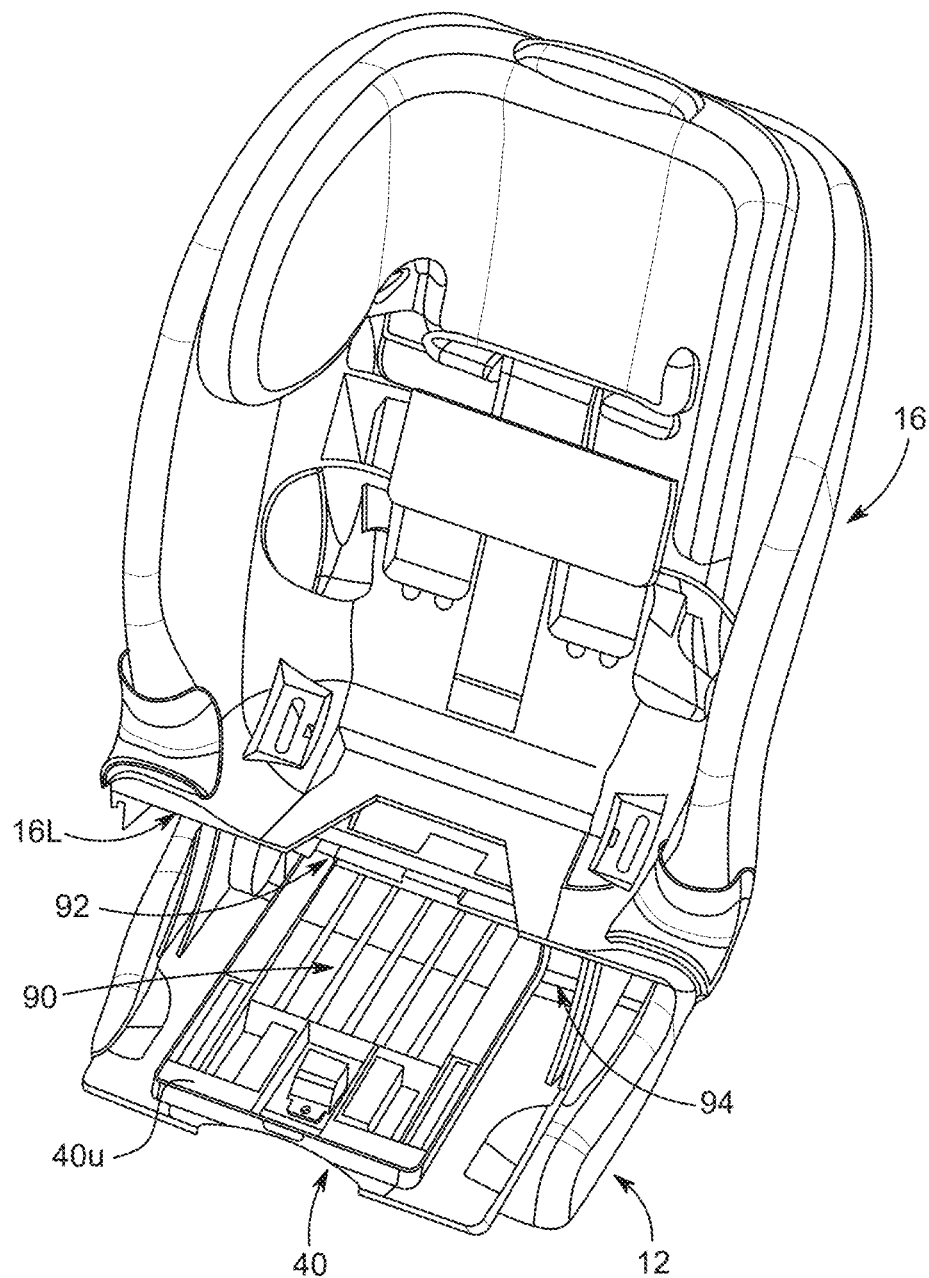

FIG. 4 is an exploded assembly view of the child restraint showing that the child restraint further includes a child restraint harness including a crotch belt or strap and buckle attached to the booster seat and pairs of shoulder and hip straps attached to the seat back to be separated from one another in the booster mode so that the seat back is unusable as a juvenile seat without the booster seat attached thereto;

FIG. 5 is a perspective view of portions of the child restraint showing a booster-seat release unit configured to retain the booster seat to a mount rod and a mount platform which are fixed to the seat back and configured to release the booster seat from the seat foundation and the seat back upon actuation of a pair of actuator handles in the forward direction;

FIG. 6 is a top view of the booster-seat release unit;

FIG. 7A is a perspective view showing the booster seat separated from the seat foundation and the seat back;

FIG. 7B is a perspective view showing the booster seat sliding in a rearward direction to be installed on the rest of the child restraint;

FIG. 7C is a perspective view showing the booster seat fully installed to assume the juvenile-seat mode;

FIG. 8A is a side view showing a latch hook included in the booster-seat release unit;

FIG. 8B is a side view similar to FIG. 8A showing the latch hook engaging the mount rod during installation of the booster seat;

FIG. 8C is a side view similar to FIG. 8B showing the booster seat fully installed and showing the latch hook in a locked position; and FIG. 9 is a perspective view of the child restraint with the booster seat removed to show that the mount platform is formed to include a plurality of ribs and showing that the seat back is formed to include a notch to indicate to users that the child restraint cannot be used as a seat without the booster seat being installed in the juvenile-seat mode.

DETAILED DESCRIPTION

Figures 1, 2:
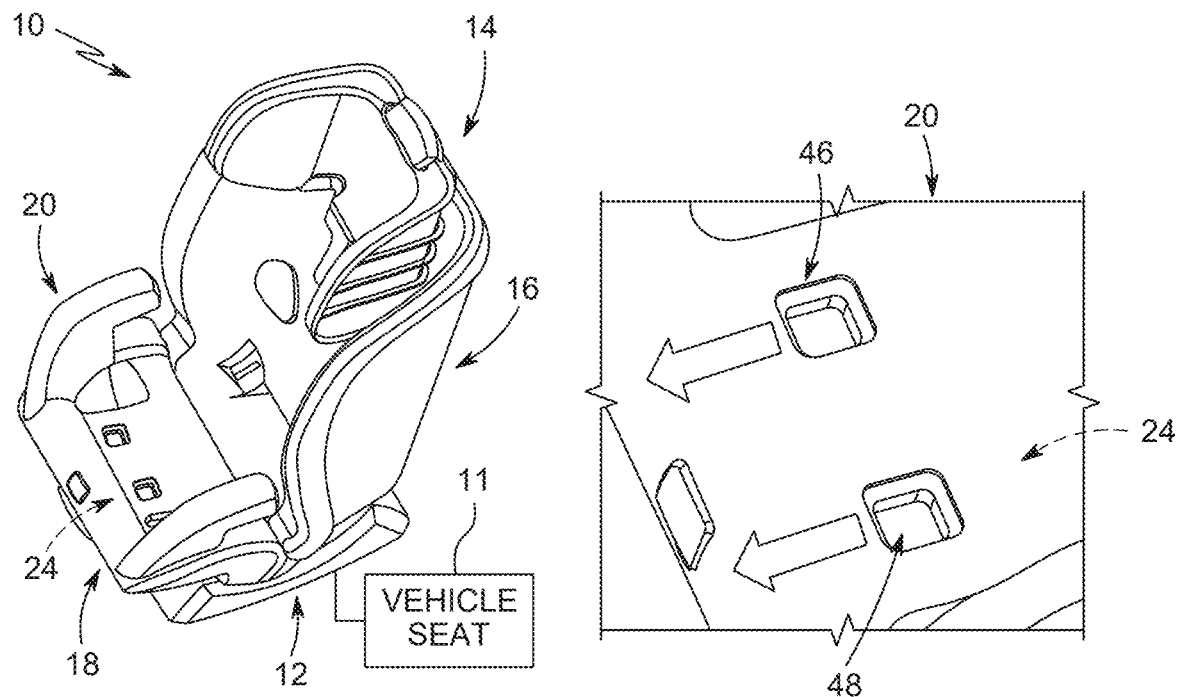
FIG. 2 is an enlarged view of a portion of FIG. 1 showing a pair of actuator handles exposed on a seating surface of the booster seat and which are used to separate the booster seat from the seat foundation and the seat back of the child restraint.
Figure 3:
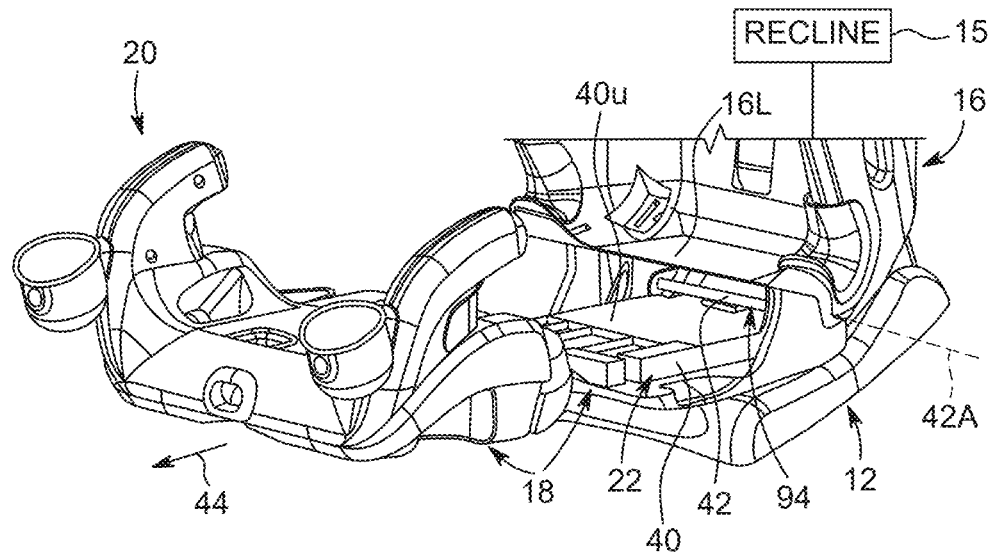
FIG. 3 is a perspective view of the booster seat sliding in a forward direction away from the seat back to be used in the booster mode.

A child restraint 10 is configured to be used in a juvenile-seat mode, as shown in FIG. 1, and includes a removable booster seat 20 that is separable from other portions of the child restraint 10 to be used separately in a booster mode as shown in FIG. 3. The child restraint 10 includes a seat foundation 12 adapted to rest on a vehicle seat 11, a juvenile seat 14 mounted on the seat foundation 12, and a child restraint harness 26 configured to secure a child to the juvenile seat 14 in the juvenile-seat mode. The seat foundation 12 supports the juvenile seat 14 above the vehicle seat 11 and separates from the booster seat 20 in the booster mode. The juvenile seat 14 includes the booster seat 20 and other components which cooperate with the booster seat 20 to provide a seating surface for a child in the juvenile-seat mode.

The juvenile seat 14 includes a seat back 16 fixed to the seat foundation 12 for movement therewith and a seat bottom 18 coupled to the seat back 16 as shown in FIGS. 1-4. The seat bottom 18 includes the booster seat 20 and a booster-seat mount 22 fixed to the seat back 16 for movement therewith. The booster seat 20 attaches to the booster-seat mount 22 to arrange the child restraint 10 in the juvenile-seat mode where the booster seat 20 and the seat back 16 cooperate to provide a seating surface for a child. The booster seat 20 is selectively removable from the booster-seat mount 22 to separate the booster seat 20 from the seat foundation 12, the seat back 16, and the booster-seat mount 22 and assume the booster mode as suggested in FIG. 3. When the booster seat 20 is coupled to the seat back 16 the unit 10 can be used as a juvenile seat for relatively younger/smaller children. With the booster seat 20 removed it can be used as a standalone booster for relatively older/larger children.

In the illustrative embodiment, the juvenile seat 14 further includes a booster-seat release unit 24 configured to block selectively separation of the booster seat 20 from the booster-seat mount 22 as shown in FIGS. 7-10. The booster-seat release unit 24 is configured to disengage from the booster-seat mount 22 so that the booster seat 20 is separable from the seat foundation 12 and the seat back 16 for placement on the vehicle seat 11 without the seat foundation 12 and the seat back 16 in the booster mode.

The child restraint harness 26 includes a crotch belt 28 coupled to the booster seat 20, a buckle 30 coupled to the crotch belt 28, and a pair of shoulder straps 32, 34 coupled to the seat back 16 as shown in FIG. 4. The shoulder straps 32, 34 are configured to attach selectively to the buckle 30 to secure a child to the juvenile seat 14 in the juvenile-seat mode. The child-restraint harness may further include a pair of hip straps 36, 38 which may be coupled either the booster seat 20 or the seat back 16. In the booster mode, the booster seat 22, the crotch belt 28, and the buckle 30 are separated from the seat back 16 and the pair of shoulder straps 32, 34 so that the pair of shoulder straps 32, 34 cannot be used to secure a child to the seat back 16 without the booster seat 20 being attached to the booster-seat mount 22 in the juvenile-seat mode.

The booster-seat mount 22 includes a mount platform 40 fixed to the seat back 16 and a mount rod 42 coupled to the mount platform 40 as shown in FIGS. 4 and 5. The mount platform 40 is arranged to extend in a forward direction 44 away from the seat back 16 and supports the booster seat 20 above the seat foundation 12 in the juvenile-seat mode. The booster seat release unit 24 is configured to engage the mount rod 42 in the juvenile-seat mode to block selectively movement of the booster seat in the forward direction 44 away from the seat back 16. The mount rod 42 may be coupled solely to the mount platform 40 in some embodiments. In other embodiments, the mount rod 42 passes through openings formed in the mount platform 40 and the seat foundation 12 to couple the juvenile seat 14 to the seat foundation 12.

In some embodiments, the child restraint 10 further includes a recline mechanism 15 to allow the juvenile seat 14 to pivot/recline relative to the seat foundation 12 so that a child seated on the juvenile seat 14 is oriented properly when the child restraint 10 is attached to the vehicle seat 11 in the juvenile-seat mode. The mount rod 42 may provide a pivot point or axis 42A for the juvenile seat 14 to pivot/recline relative to the seat foundation 12.

The booster-seat release unit 24 includes a pair of actuators 46, 48 exposed in a seating surface of the booster seat 20 as shown in FIGS. 1-4. To uncouple the booster seat 20 from the booster-seat mount 22, a user pulls both actuators 46, 48 in the forward direction 44. Pulling the actuators 46, 48 in the forward direction 44 allows a user to uncouple or unlatch the booster seat 20 from the booster-seat mount 22. Once uncoupled the booster seat 20 may be slid in the forward direction 44 away from the seat back 16 as shown in FIG. 3.

The actuators 46, 48 are designed to actuate a total of four locking mechanisms that are located in the booster seat 20 and latch onto corresponding features of the booster-seat mount 22 as shown in FIG. 5. A first set of locking mechanisms 50, 52 are located at respective lateral sides of the booster seat 20. The first set of locking mechanisms include a pair of pivot locks 54, 56 that are biased to engage/extend into slots 58, 60 formed in the booster-seat mount 22 to secure the booster seat 20 to the booster-seat mount 22. Pulling the actuators 46, 48 causes a pair of forward extending horizontal arms 55, 57 to move forward and bias/urge the pivot locks 54, 56 to pivot outward and free the pivot locks 54, 56 from the slots 58, 60 formed in the sides of the booster-seat mount 22. A cam 59, 61 is coupled to an end of each horizontal arm 55, 57 and is configured to engage a respective pivot lock 54, 56 and cause each respective pivot lock 54, 56 to pivot about an axis 54A, 56A out of the slots 58, 60 in response to the actuator handles 46, 48 moving from a locked position to a released position. The pivot locks 54, 56 are biased toward one another and toward the slots 58, 60 to automatically extend into the slots 58, 60 and assume a locked position when the booster seat 20 is fully installed.

A second set of locking mechanisms includes a pair of rotating latch hooks 66, 68 at the rear of the booster seat 20 as shown in FIG. 8A. The latch hooks 66, 68 are configured to engage the mount rod 42 in the juvenile-seat mode. Forward movement of the actuators 46, 48 causes the latch hooks 66, 68 to rotate to release the hooks 66, 68 from the rod 42. Pulling the actuators 46, 48 in the forward direction 44 causes the two pivot locks 54, 56 and the two latch hooks 66, 68 to disengage from the slots 58, 60 and mount rod 42, respectively, to allow the booster seat 20 to be removed from the booster-seat mount 22.

The latch hooks 66, 68 include a hook body 70 and a pair of motion-blocking flanges 72, 74 as shown in FIGS. 8A-8C. The hook body 70 defines a rod-receiving space 76 which receives the mount rod 42 in the juvenile-seat mode as shown in FIGS. 7C and 8C. Motion blocking flange 72 normally rests on a stop 78 on the horizontal arms 55, 57 such that each latch hook 66, 68 is normally in an opened, unlatched position in the booster mode. As the booster seat 20 is moved in a rearward direction 80 during installation, the mount rod 42 is configured to engage and rotate the latch hooks 66, 68. Motion-blocking flange 74 eventually reaches and passes the stop 78. The horizontal arms 55, 57 are biased in a rearward direction 80 to urge the stop 78 under the motion-blocking flange 74 when the booster seat 20 reaches a fully-installed position. Thus, the latch hooks 66, 68 are maintained in a locked position by the stops 78 until the horizontal arms 55, 57 are pulled in the forward direction 44 by the actuator handles 46, 48 as shown in FIG. 8C.

In some embodiments, the booster-seat mount 22 include a series of ribs 90 formed on a top surface 22T thereof to indicate to users that the booster-seat mount 22 cannot be used as a seat without the booster seat 20 attached thereto. In some embodiments, the seat back 16 is formed to include a notch 92 in a lower end 16L thereof. The ribs 90 and the notch 92 visually indicate to users that juvenile seat 14 is not usable without the booster seat 20 being attached.

The juvenile seat 14 is formed to include a booster-seat opening 94 located vertically between the lower end 16L of the seat back 16 and an upper end 40U of the booster-seat mount 22. A rear end of the booster seat 20 is sized to fit in the booster-seat opening 94 in the juvenile-seat mode to locate the booster seat 20 vertically between the mount platform 40 and the lower end 16L of the seat back 16. The booster seat includes an outer shell 20S having an upper surface 20U configured to support the child in both the juvenile-seat mode and the booster seat mode and a bottom surface 20B. The bottom surface 20B is configured to engage the upper surface 40U of the mount platform 40 in the juvenile-seat mode and is configured to engage the vehicle seat 11 in the booster mode. In some embodiments, the booster-seat release unit 24 is arranged entirely between the upper surface 20U and the bottom surface 20B of the outer shell 20S.

The invention claimed is:

1. A child restraint comprising
a seat foundation adapted to rest on a vehicle seat,
a juvenile seat including a seat back fixed to the seat foundation and a seat bottom coupled to the seat back, the seat bottom including a booster-seat mount fixed to the seat back, a booster seat coupled to the booster-seat mount to arrange the child restraint in a juvenile-seat mode where the booster seat and the seat back cooperate to provide a seating surface for a child, and a booster-seat release unit configured to block selectively separation of the booster seat from the booster-seat mount and configured to disengage from the booster-seat mount so that the booster seat is separable from the seat back and the seat foundation for placement on the vehicle seat without the seat foundation and the seat back in a booster mode, and
a child restraint harness including a crotch belt coupled to the booster seat, a buckle coupled to the crotch belt, and a pair of should straps coupled to the seat back and configured to attach selectively to the buckle to secure a child to the juvenile seat in the juvenile-seat mode,
wherein the booster-seat mount includes a mount platform fixed to the seat back and arranged to extend in a forward direction away from the seat back and a mount rod coupled to the mount platform and to the seat foundation to mount the seat back and the booster-seat mount to the seat foundation, and
wherein, in the juvenile-seat mode, the booster-seat release unit engages the mount rod to fix the booster seat to booster-seat mount, and, in the booster mode, the booster seat, the crotch belt, and the buckle are separated from the seat back and the pair of shoulder straps so that the pair of shoulder straps cannot be used to secure a child to the seat back without the booster seat being attached to the booster-seat mount in the juvenile-seat mode.

2. The child restraint of claim 1, wherein the seat back, the mount platform, and the booster seat are configured to pivot relative to the seat foundation about the mount rod in the juvenile-seat mode.

3. The child restraint of claim 1, wherein the booster-seat release unit includes an actuator handle accessible through an opening formed in an upper surface of the booster seat and a latch hook coupled to the actuator handle below the upper surface of the booster seat and configured to engage the mount rod in the juvenile-seat mode to block separation of the booster seat from the booster-seat mount.

4. The child restraint of claim 3, wherein the booster-seat release unit further includes a horizontal arm coupled to the actuator handle and located below the upper surface of the booster seat, and a pivot lock arranged to extend into a slot formed in the mount platform when the child restraint is in the juvenile-seat mode.

5. The child restraint of claim 4, wherein the horizontal arm includes a cam configured to engage the pivot lock and to pivot the pivot lock out of the slot in response to movement of the actuator handle from a locked position to a released position.

6. The child restraint of claim 5, wherein the latch hook disengages from the mount rod when the actuator handle is moved to the released position at the same time the cam causes the pivot lock to pivot relative to the booster seat and move out of the slot.

7. The child restraint of claim 3, wherein the booster seat release unit further includes a second actuator handle accessible through a second opening formed in the upper surface of the booster seat and a second latch hook coupled to the second actuator handle below the upper surface of the booster seat and configured to engage the mount rod in the juvenile-seat mode to block separation of the booster seat from the booster-seat mount, and wherein each actuator handle is independently movable between a locked position and a released position to provide two-handed separation to release the booster seat from the mount rod.

8. The child restraint of claim 7, wherein each latch hook is biased toward an open position and is configured to engage and automatically move to a locked position on the mount rod in response to installation of the booster seat on the mount platform.

9. The child restraint of claim 8, wherein the booster-seat release unit further includes a first horizontal arm coupled to the actuator handle and located below the upper surface of the booster seat, a first pivot lock arranged to extend into a first slot formed in a first lateral side of the mount platform when the child restraint is in the juvenile-seat mode, a second horizontal arm coupled to the second actuator handle and located below the upper surface of the booster seat, and a second pivot lock arranged to extend into a second slot formed in an opposite, second lateral side of the mount platform when the child restraint is in the juvenile-seat mode.

10. The child restraint of claim 9, wherein the first horizontal arm includes a first cam configured to engage the first pivot lock and to pivot the first pivot lock in a first direction out of the first slot in response to movement of the actuator handle from the locked position to the released position, and the second horizontal arm includes a second cam configured to engage the second pivot lock and to pivot the second pivot lock in an opposite, second direction out of the second slot in response to movement of the second actuator handle from the locked position to the released position, and wherein the first and second latch hooks disengage from the mount rod at the same time the first and second cams cause the first and second pivot locks to pivot relative to the booster seat and move out of the first and second slots.

11. The child restraint of claim 1, wherein the juvenile seat is formed to include a booster-seat opening located vertically between a lower end of the seat back and an upper end of the booster-seat mount, and a rear end of the booster seat is sized to fit in the booster-seat opening in the juvenile-seat mode to locate the booster seat vertically between the booster-seat mount and the lower end of the seat back.

12. The child restraint of claim 11, wherein the booster seat includes an outer shell having an upper surface configured to support the child in both the juvenile-seat mode and the booster seat mode and a bottom surface configured to engage an upper surface of the mount platform in the juvenile seat mode and configured to engage the vehicle seat in the booster mode.

13. The child restraint of claim 12, wherein the booster-seat release unit is arranged entirely between the upper surface and the bottom surface of the outer shell.

14. A child restraint comprising
a seat back,
a seat bottom coupled to the seat back, the seat bottom including a booster-seat mount fixed to the seat back, a booster seat coupled to the booster-seat mount to arrange the child restraint in a juvenile-seat mode in which the booster seat and the seat back cooperate to provide a seating surface for a child, and a booster-seat release unit configured to block selectively separation of the booster seat from the booster-seat mount and configured to disengage from the booster-seat mount so that the booster seat is separable from the seat back for placement on a vehicle seat without the seat back in a booster mode, and
a child restraint harness including a buckle coupled to the booster seat and a pair of shoulder straps coupled to the seat back and configured to attach selectively to the buckle to secure a child to the juvenile seat in the juvenile-seat mode,
wherein the booster-seat mount includes a mount platform fixed to the seat back and arranged to extend in a forward direction away from the seat back and a mount rod coupled to the mount platform, and
wherein, in the juvenile-seat mode, the booster-seat release unit engages the mount rod to fix the booster seat to booster-seat mount, and, in the booster mode, the booster seat and the buckle are separated from the seat back and the pair of shoulder straps so that the pair of shoulder straps cannot be used to secure a child to the seat back without the booster seat being attached to the booster-seat mount in the juvenile-seat mode.

15. The child restraint of claim 14, wherein the booster-seat release unit includes an actuator handle accessible through an opening formed in an upper surface of the booster seat and a latch hook coupled to the actuator handle below the upper surface of the booster seat and configured to engage the mount rod in the juvenile-seat mode to block separation of the booster seat from the booster-seat mount.

16. The child restraint of claim 15, wherein the booster-seat release unit further includes a horizontal arm coupled to the actuator handle and located below the upper surface of the booster seat, and a pivot lock arranged to extend into a slot formed in the mount platform when the child restraint is in the juvenile-seat mode.

17. The child restraint of claim 16, wherein the horizontal arm includes a cam configured to engage the pivot lock and to pivot the pivot lock out of the slot in response to movement of the actuator handle from a locked position to a released position.

18. The child restraint of claim 17, wherein the latch hook disengages from the mount rod when the actuator handle is to the released position at the same time the cam causes the pivot lock to pivot relative to the booster seat and move out of the slot.

19. The child restraint of claim 14, wherein the juvenile seat is formed to include a booster-seat opening vertically between a lower end of the seat back and an upper end of the booster-seat mount, and a rear end of the booster seat is sized to fit in the booster-seat opening in the juvenile-seat mode to locate the booster seat vertically between the booster-seat mount and the lower end of the seat back.

\* \* \* \* \*